US012060688B2

(12) United States Patent
Lenarcic et al.

(10) Patent No.: US 12,060,688 B2
(45) Date of Patent: Aug. 13, 2024

(54) FOUNDATION FOR A GENERATOR

(71) Applicant: Siemens Energy, Inc., Orlando, FL (US)

(72) Inventors: Brett Lenarcic, Charlotte, NC (US); Tristan Mills, Charlotte, NC (US)

(73) Assignee: Siemens Energy, Inc., Orlando, FL (US)

( * ) Notice: Subject to any disclaimer, the term of this patent is extended or adjusted under 35 U.S.C. 154(b) by 429 days.

(21) Appl. No.: 17/427,852

(22) PCT Filed: Feb. 7, 2019

(86) PCT No.: PCT/US2019/017056
§ 371 (c)(1),
(2) Date: Aug. 2, 2021

(87) PCT Pub. No.: WO2020/162940
PCT Pub. Date: Aug. 13, 2020

(65) Prior Publication Data
US 2022/0127813 A1  Apr. 28, 2022

(51) Int. Cl.
*H02K 5/26* (2006.01)
*E02D 27/44* (2006.01)
*F16M 7/00* (2006.01)
*F16M 9/00* (2006.01)

(52) U.S. Cl.
CPC ............... *E02D 27/44* (2013.01); *F16M 7/00* (2013.01); *F16M 9/00* (2013.01); *H02K 5/26* (2013.01)

(58) Field of Classification Search
CPC ...... H02K 15/0006; H02K 5/26; F01D 25/28; F16M 1/026; F16M 1/00; F16M 7/00; F16M 9/00; E02D 27/44
See application file for complete search history.

(56) References Cited

U.S. PATENT DOCUMENTS

| 4,033,531 A * | 7/1977 | Levine ...................... H02K 5/26 248/676 |
| 2003/0014961 A1 | 1/2003 | Lawlor et al. |
| 2007/0023591 A1 | 2/2007 | Kwon et al. |
| 2012/0007457 A1 | 1/2012 | Andersson et al. |

(Continued)

FOREIGN PATENT DOCUMENTS

| CA | 1292730 C | 12/1991 |
| CN | 204062351 U | 12/2014 |

(Continued)

OTHER PUBLICATIONS

PCT International Search Report and Written Opinion of International Searching Authority mailed Oct. 30, 2019 corresponding to PCT International Application No. PCT/US2019/017056 filed Feb. 7, 2019.

*Primary Examiner* — Leda T Pham

(57) ABSTRACT

A generator supported by a foundation includes a generator housing defining a first side and a second side that extend along a rotational axis of the generator, a first frame foot removably attached to the first side, and a second frame foot removably attached to the second side, wherein a height of the first frame foot and the second frame foot is selected to position the rotational axis at a desired height above the foundation, and wherein a width of the first frame foot and the second frame foot is selected to engage the foundation.

16 Claims, 6 Drawing Sheets

(56) References Cited

U.S. PATENT DOCUMENTS

| | | | |
|---|---|---|---|
| 2016/0161048 A1 | 6/2016 | Davi et al. | |
| 2016/0161049 A1* | 6/2016 | Davi | H02K 15/0006 |
| | | | 414/800 |
| 2017/0250593 A1* | 8/2017 | Arai | H02K 15/0006 |
| 2018/0248422 A1 | 8/2018 | Helander et al. | |

FOREIGN PATENT DOCUMENTS

| | | |
|---|---|---|
| CN | 206018159 U | 3/2017 |
| CN | 207082934 U | 3/2018 |
| CN | 207743798 U | 8/2018 |
| CN | 207819652 U | 9/2018 |
| DE | 2361971 A1 | 5/1975 |
| DE | 102006035036 A1 | 3/2007 |
| EP | 3103973 A1 | 12/2016 |
| EP | 3211766 A1 | 8/2017 |

\* cited by examiner

FOUNDATION FOR A GENERATOR

TECHNICAL FIELD

The present disclosure is directed, in general, to a modular generator frame foot, and more specifically to a modular generator frame foot selectable to adjust the position of the generator.

BACKGROUND

Generators are used to convert rotational energy to electrical energy. Often, generators are attached to gas turbine engines, steam turbine engines, hydro turbines, wind turbines, and the like. Generators are large heavy machines that are typically supported on a concrete foundation. The foundation includes a space into which a portion of the generator sits. The width of the space can vary depending on the location. In addition, different attachments (i.e., engines, prime movers, etc.) may require the height of the generator centerline at different levels above the foundation.

SUMMARY

A generator supported by a foundation includes a generator housing defining a first side and a second side that extend along a rotational axis of the generator, a first frame foot removably attached to the first side, and a second frame foot removably attached to the second side, wherein a height of the first frame foot and the second frame foot is selected to position the rotational axis at a desired height above the foundation, and wherein a width of the first frame foot and the second frame foot is selected to engage the foundation.

In another construction, a generator supported by a foundation includes a generator housing defining a first side and a second side that extend along a rotational axis of the generator, a first plurality of frame feet removably attached to the first side, and a second plurality of frame feet removably attached to the second side. Each frame foot includes a plurality of fasteners arranged to threadably engage the generator housing and a shear key engageable with the frame foot and the generator housing to inhibit movement in a direction normal to the rotational axis. A height of each frame foot is selected to position the rotational axis at a desired height above the foundation, and a width of each frame foot is selected to engage the foundation.

In another construction, a method of supporting a generator in a foundation having an opening width includes selecting a generator having a housing, the housing including a right-side attachment space on a right side of the housing and a left-side attachment space on a left side of the housing that cooperate to define a housing width. The method also includes removably attaching a first frame foot to the right side of the housing, the first frame foot having a first height and a first width, removably attaching a second frame foot to the left side of the housing, the second frame foot having a second height and a second width, and attaching the generator to the foundation. The first width and the second width are selected such that the sum of the first width, the second width, and the housing width is greater than the opening width, and the first height and the second height are selected to position a centerline of the generator at a desired vertical elevation with respect to the foundation.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
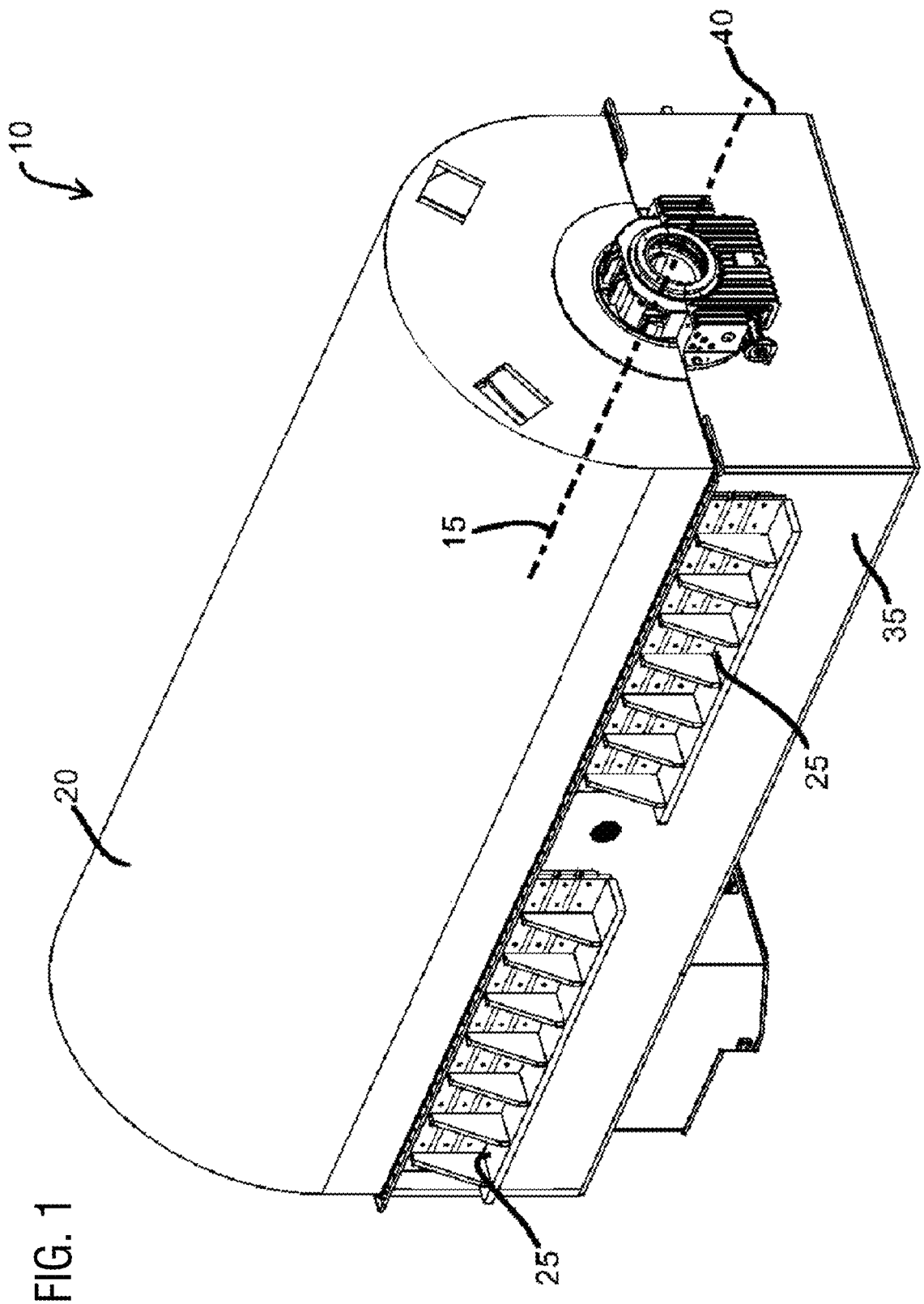
FIG. 1 is a perspective view of a generator including a generator housing.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

A generator 10 includes a rotor (not shown) supported for rotation about a rotational axis or centerline 15 and a stator that surrounds the rotor. The rotor and stator cooperate to convert mechanical energy in the form of torque applied to the rotor into electrical energy. The stator is disposed within a housing 20 that protects the stator and supports the stator in the desired operating position. The generator housing also provides for cooling gas (e.g., air, hydrogen, etc.) flow through the generator 10 that operates to cool the stator and the rotor as may be required during operation.

FIG. 1 illustrates the generator housing 20 and a plurality of frame feet 25 that are arranged to engage a foundation 30 (shown in FIGS. 7-10) on a right side 35 and a left side 40 of the housing 20 to support the generator housing 20 and the stator disposed therein.

Figure 2:
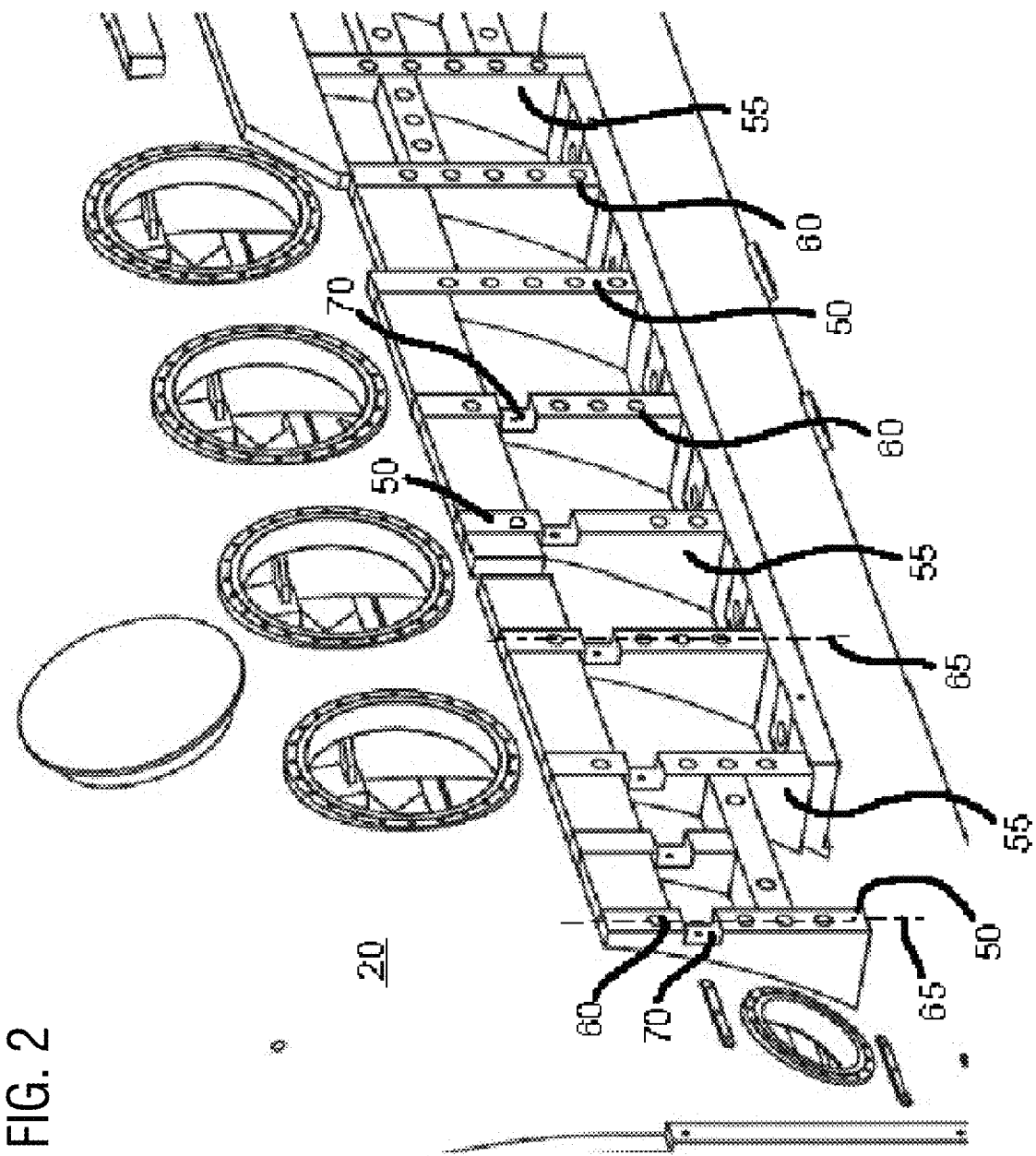
FIG. 2 is a perspective view of an attachment space of the generator housing of FIG. 1.

FIG. 2 is a partially broken away perspective view of one-half of one side of the generator housing 20 illustrating an attachment space 45. The attachment space 45 includes a plurality of surfaces 50 arranged on a plane that is parallel to the rotational axis 15 and normal to the foundation 30 (i.e., a vertical longitudinal plane). In the illustrated construction, each surface 50 is defined by the edge of a plate 55 that adds support to the generator housing 20. Each surface 50 includes a plurality of threaded holes 60 arranged along a vertical axis 65, with the different vertical axes 65 and surfaces 50 spaced apart from one another along an axial length of the housing 20. A rectangular slot 70 is formed in each of the surfaces 50 between two of the threaded holes 60. In the illustrated construction, the rectangular slots 70 are aligned with one another along a line parallel to the rotational axis 15. However, the slots 70 could be arranged in a non-aligned or staggered fashion if desired.

Figure 5:
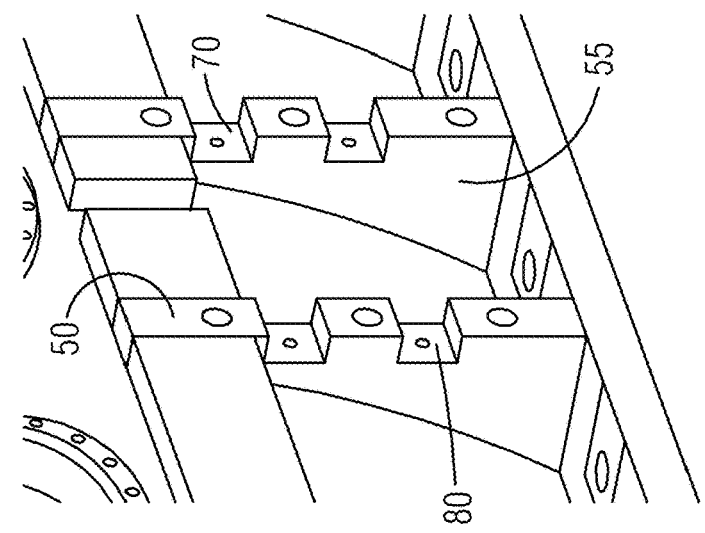
FIG. 5 is a perspective view of a portion of another attachment space of a generator housing.

While the generator housing 20 of FIG. 2 includes a single slot 70 in each of the surfaces 50 aligned along a common axis, other constructions may include multiple slots 70. FIG. 5 illustrates a portion of an attachment space 75 that includes two slots 70, 80 in each of the surfaces 50. The second set of slots 80 are offset from the first set of slots 70 but are aligned along a common axis that is parallel to the common axis of the first set of slots 70. While each of the two slots 70, 80 are illustrated as being similar in size, different sizes could also be employed if desired.

Figure 6:
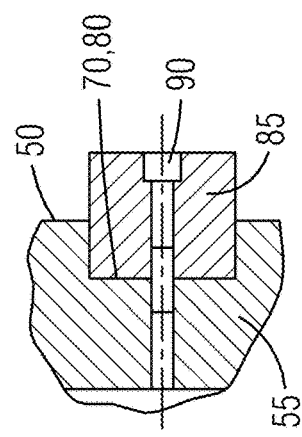
FIG. 6 is a section view of a shear key disposed in a slot of the frame foot of FIG. 3.

With reference to FIG. 6, each of the slots 70, 80 is sized to receive a shear key 85. Each shear key 85 can include a block that is similar in width to the plate 55 in which the slot 70, 80 is formed or could be somewhat wider or narrower. In still other constructions, a single shear key extends the full length of the attachment space 45, 75 to engage one slot 70, 80 in each plate 55, or shear keys extend across two or more plates 55 to engage two or more slots 70, 80. Fasteners 90 extend through the shear keys 85 to removably attach the shear keys 85 to the housing 20 for convenience.

Figure 3:
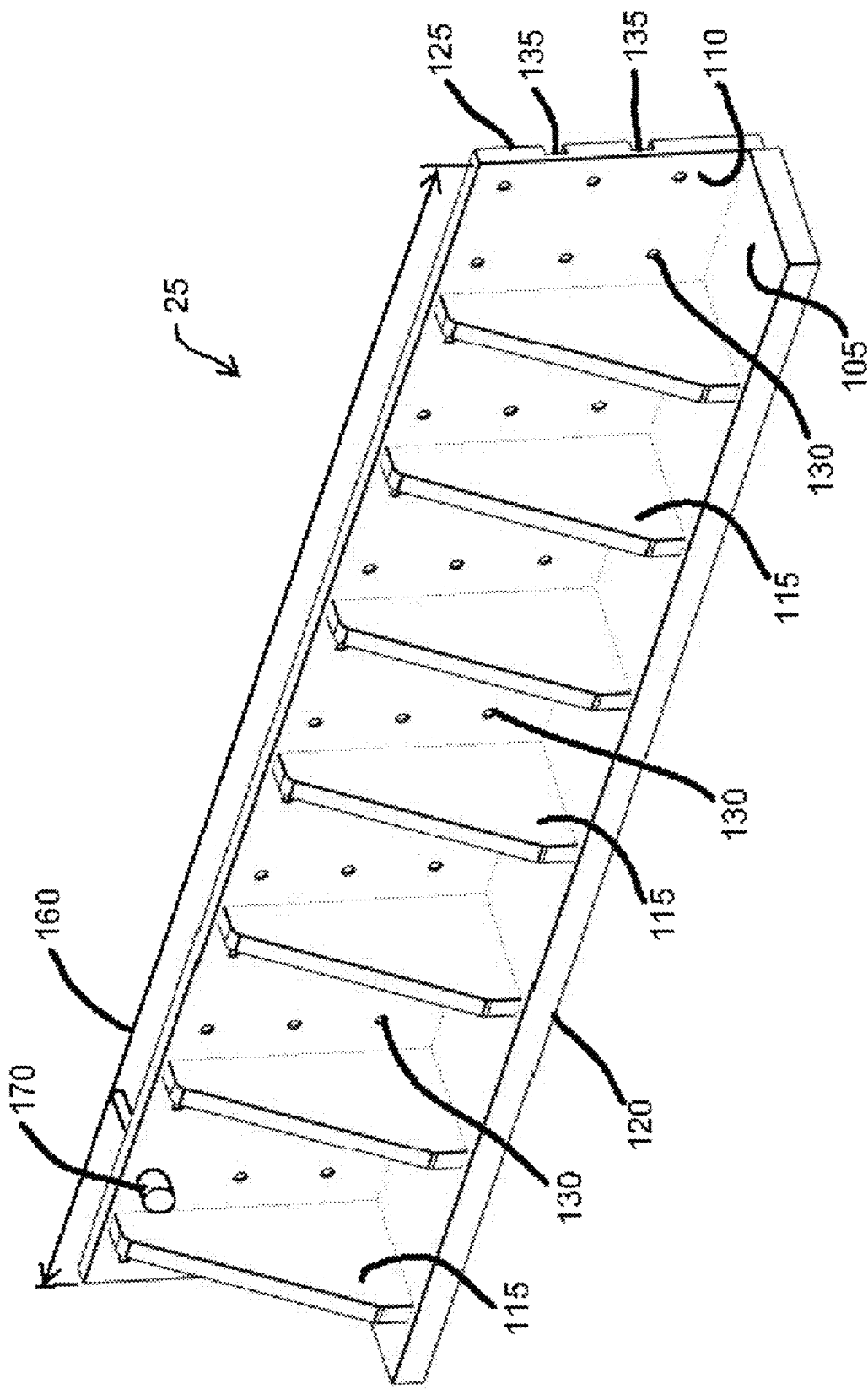
FIG. 3 is a perspective view of a frame foot suitable for use with the generator housing of FIG. 1.

FIG. 3 illustrates a frame foot 95 that is attachable to the attachment space 45, 75 illustrated in FIG. 2 or FIG. 5. The illustrated frame foot 95 defines a length 100 that extends about one quarter of the length of the generator housing 20 to which it attaches. Thus, the generator housing 20 as illustrated in FIG. 1 would include four frame feet 95 as illustrated in FIG. 3. In other constructions, a frame foot that extends the full length of the generator housing 20 could be employed or frame feet that extend less than one quarter of the length could be employed such that two or more frame feet are employed on each side of the generator housing 20.

The frame foot 95 of FIG. 3 includes a foundation plate 105, a mounting plate 110, and a plurality of gusset plates 115. The foundation plate 105 includes a substantially planar plate of structural material, typically steel, that defines a first surface 120 sized and shaped to engage the foundation 30 for attachment of the generator housing 20. In most constructions, the foundation plate 105 is attached using a grout material that binds the first surface 120 of the foundation plate 105 to the foundation 30. However, some constructions may employ an adhesive, bolts, studs, or other fasteners to enhance the attachment between the foundation plate 105 and the foundation 30.

The mounting plate 110 is a substantially planar plate material, typically steel, that attaches to the foundation plate 105 at about a ninety-degree angle. The mounting plate 110 includes a second surface 125 that is arranged to engage the attachment space 45, 75 of the generator housing 20. A plurality of holes 130 each pass through the mounting plate 110 and are arranged to align with the threaded holes 60 formed in the surfaces 50 of the attachment space 45, 75 of the generator housing 20.

The gusset plates 115 each attach to the mounting plate 110 and the foundation plate 105 to provide the desired stiffness, strength, and rigidity to the completed frame foot 95. In preferred constructions, the mounting plate 110, the foundation plate 105, and the gusset plates 115 are welded to one another with other connections being possible.

Figure 4:
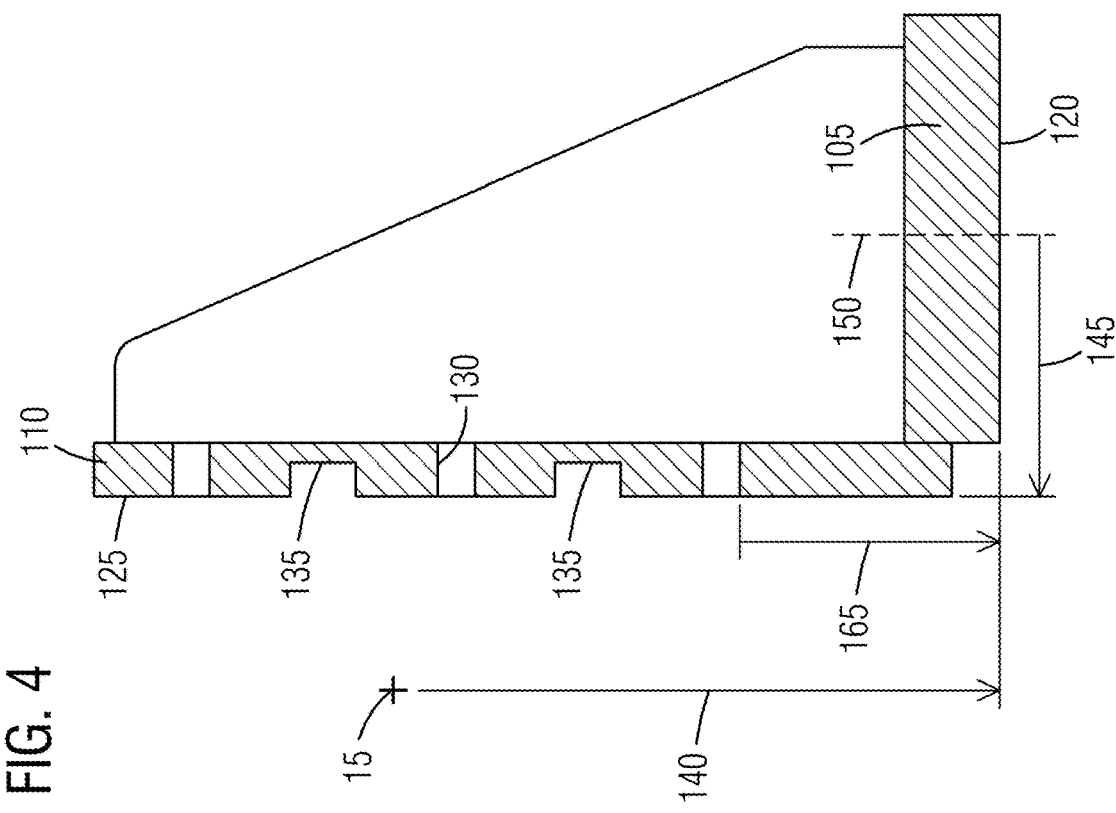
FIG. 4 is a section view of the frame foot of FIG. 3 taken along line 4-4 of FIG. 3.

As illustrated in FIG. 4, the first surface 120 of the foundation plate 105 and the second surface 125 of the mounting plate 110 are preferably machined to assure that they define about a ninety-degree angle therebetween. The second surface 125 is also machined to form one or more slots 135 sized to receive shear keys. In the illustrated construction two slots 135 extend the full length of the mounting plate 110, with three through holes 130 or bolt holes positioned around the slots 135.

The components of the frame foot 95 are selected to define a height 140 and a width 145 for the frame foot 95. The height 140 is measured from the first surface 120 of the foundation plate 105 to the centerline 15 of the generator 10 and will be discussed in greater detail with regard to FIGS. 9 and 10. The width 145 can be measured in a number of ways with FIG. 4 illustrating the width 145 as being measured from the second surface 125 of the mounting plate 110 to a center 150 of the foundation plate 105. Other width measurements could be measured from the second surface 125 of the mounting plate 110 to an inside or near edge of the foundation plate 105 or to the outside corner or outside edge of the foundation plate 105. The width 145 is important to assure that the frame feet 95 are positioned to engage the foundation 30 and properly support the generator 10. As will be clearly shown in the discussion of FIGS. 7 and 8, the important width is the distance between the frame feet 95 on either side of the generator 10. This could be measured from center 150 to center 150, inside edge to inside edge, or outside edge to outside edge as may be desired.

In use, the user first selects the proper frame feet 95 for the particular generator 10 and the particular foundation 30. As illustrated in FIGS. 7-10, each foundation 30 defines a foundation width 155 between a left side and a right side. The generator 10 is positioned on the foundation 30 with a portion of the generator 10 disposed in the space defined between the left side and the right side of the foundation 30. The generator housing 20 also defines a width 160 measured between the two attachment spaces 45, 75 on either side. In most arrangements, the generator housing width 160 is smaller than the foundation width 155 such that the frame feet 95 must extend outward enough to properly engage the foundation 30.

Figure 7:
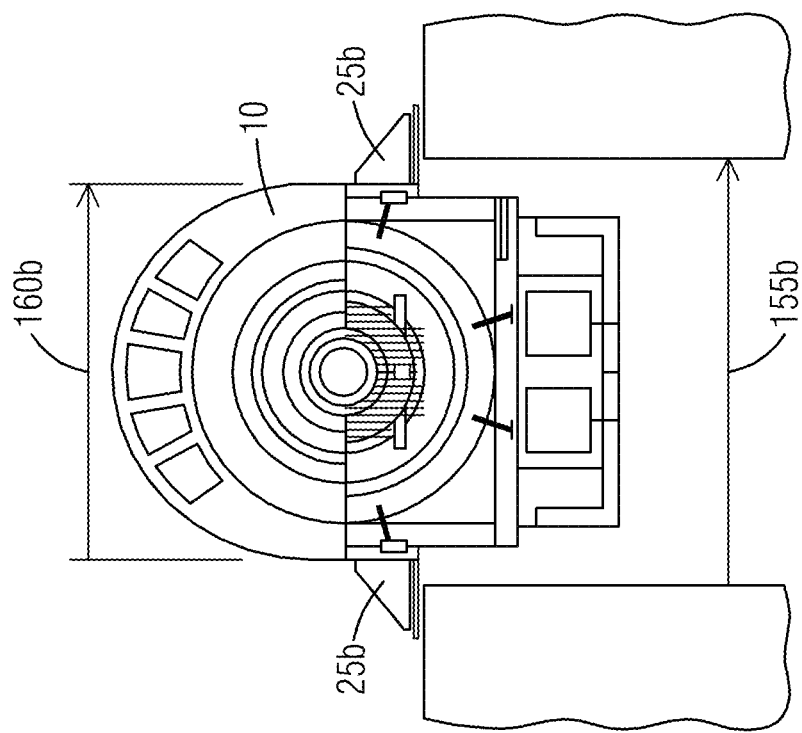
FIG. 7 is an end view of a generator positioned in a first foundation using a first set of frame feet.
Figure 8:
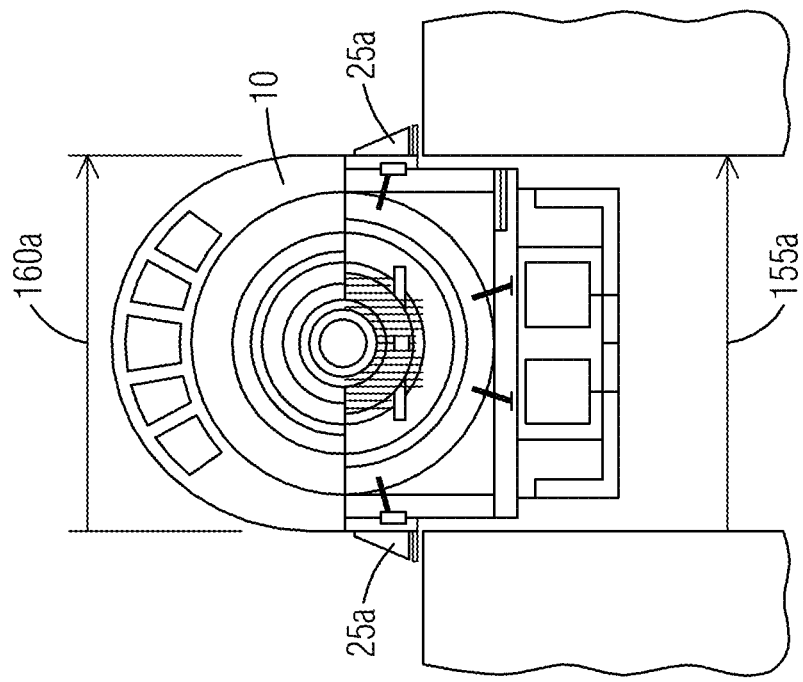
FIG. 8 is an end view of the generator positioned in a second foundation using a second set of frame feet.

FIG. 7 illustrates a foundation 30a in which the foundation width 155a is very near the generator housing width 160a such that narrow frame feet 95a can be employed. In contrast, FIG. 8 illustrates a foundation 30b that includes a foundation width 155b that is much larger than the generator housing width 160b. In this situation, wide frame feet 95b are required to properly support the generator 10 in the foundation 30. The frame foot width 145 can be adjusted by selecting narrower or wider foundation plates 105.

Once the width 145 is selected for the frame feet 95, the height 140 must be determined. The generator 10 must attach to a prime mover such as a gas turbine, steam turbine and the like to allow the generator 10 to be driven and electricity to be generated. Each of these prime movers is set on the foundation 30 with a rotational centerline 15 at a particular height 95. The generator 10 must be set to match that height 140, and more accurately to match the catenary curve on which the generator 10 will be set to properly couple to the prime mover.

Figure 10:
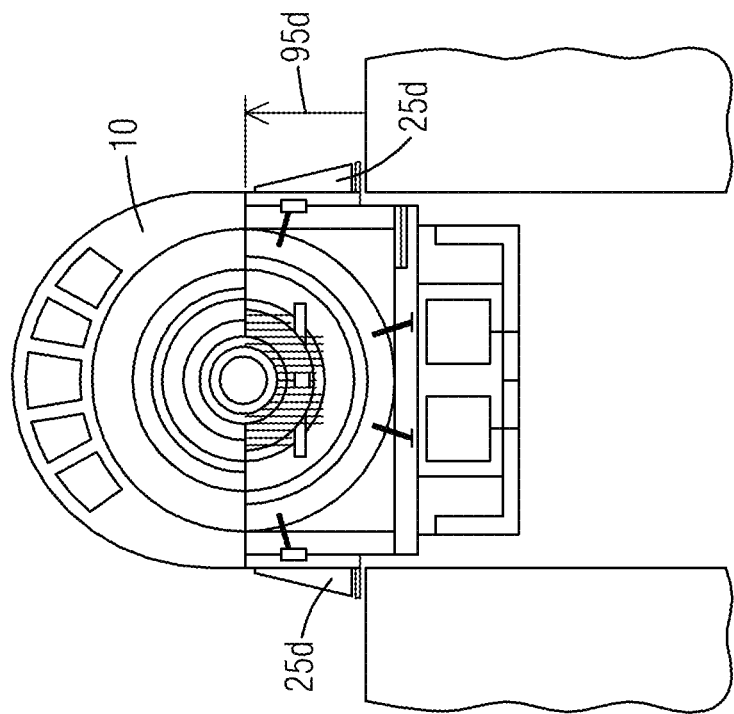
FIG. 10 is an end view of the generator positioned in a fourth foundation using a fourth set of frame feet.
Figure 9:
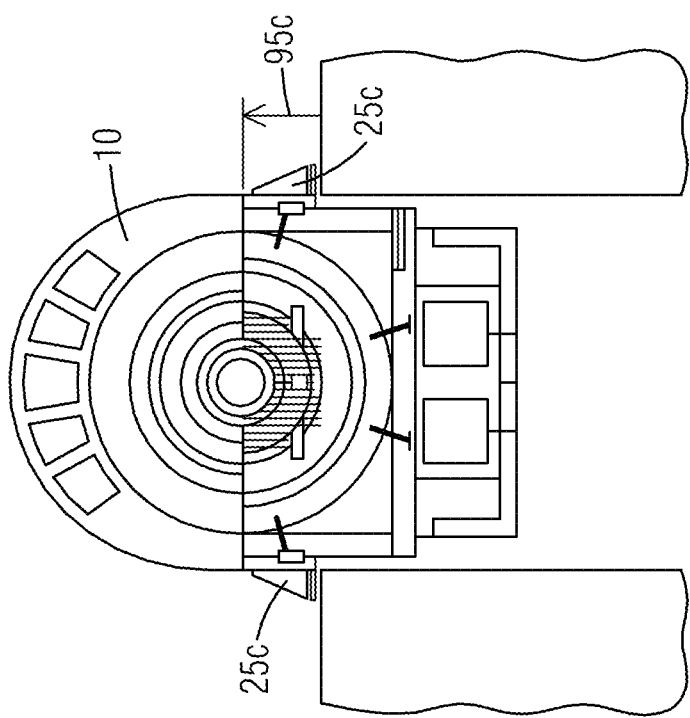
FIG. 9 is an end view of the generator positioned in a third foundation using a third set of frame feet.

FIGS. 9 and 10 illustrate two examples including two different centerline heights 95c, 95d. The generator 10 in FIG. 9 is set at the lower of the two heights 95c and therefore includes the shorter of the two frame feet 95c. FIG. 10 illustrates a higher centerline which requires higher frame feet 95d.

With reference to FIG. 4, the height 140 of the frame feet 95 is changed by increasing or decreasing an adjustment distance 165 defined between the first surface 120 of the foundation plate 105 and the lowermost bolt hole 130 in the mounting plate 110. This assures that the bolt holes 130 align with the threaded holes 60 at any selected height.

Once the height 140 and width 145 are selected, the frame feet 95 are manufactured to attach to the particular generator housing 20 being employed. The attachment is completed using a plurality of the shear keys 85 and a plurality of fasteners 170. An adhesive, tie wires, or other arrangements can be employed to lock the position of the fasteners 170 once attached to the generator housing 20. With the frame feet 95 attached to the generator housing 20, the generator 10 can be positioned on the foundation 30 as desired and grouted into place.

The use of fasteners 170 to attach the frame feet 95 rather than welding or other permanent attachment means assures that the frame feet 95 are removably attached. As used herein, "removably" means that the frame feet 95 can be removed without destroying or damaging the frame feet 95 or the generator housing 20 in any way, and common tools can be used to perform the removal. For example, if the frame feet 95 were welded to the generator housing 20, they could only be removed by cutting (e.g., torch, carbon arc, plasma, etc.) the frame feet 95 away from the generator housing 20. Such cutting would necessarily damage one or both of the frame feet 95 and the generator housing 20.

During the design and construction of a power generation facility, the foundation 30 is designed and built to match the generator 10 and the equipment driving the generator 10 such that standard or predesigned generator housings 20 can be employed. If for some reason, the foundation 30 is not as expected, the generator housing 20 may require a redesign. However, a redesign can change the structural stability of the housing 20 or negatively affect the cooling flow within the housing 20. One situation in which the housing 20 is rarely a match for a predesigned generator 10 is when a generator is damaged beyond repair and must be replaced. Often, the original generator design is no longer available, and the newer designs require a different foundation 30.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A generator supported by a foundation, the generator comprising:
   a generator housing defining a first side and a second side that extend along a rotational axis of the generator;
   a first frame foot removably attached to the first side;
   a second frame foot removably attached to the second side, wherein a height of the first frame foot and the second frame foot is selected to position the rotational axis at a desired height above the foundation, and wherein a width of the first frame foot and the second frame foot is selected to engage the foundation; and a shear key engaged with the first frame foot and the generator housing to position the rotational axis at the desired height.

2. The generator of claim 1, wherein each frame foot includes a plurality of fasteners arranged to threadably engage the generator housing, and a shear key engageable with the frame foot and the generator housing to inhibit movement in a direction normal to the rotational axis.

3. The generator of claim 2, wherein the first side of the generator includes a plurality of rows of threaded apertures, each row arranged normal to the rotational axis to receive one of the plurality of fasteners, and a plurality of slots each arranged to receive a shear key.

4. The generator of claim 1, wherein each frame foot includes a foundation plate arranged to engage the foundation, a mounting plate perpendicular to the foundation plate, and a plurality of gusset plates extending between the mounting plate and the foundation plate.

5. The generator of claim 4, wherein the mounting plate is arranged to engage the generator housing.

6. The generator of claim 1, further comprising a third frame foot removably attached to the first side and a fourth frame foot removably attached to the second side, and wherein the first frame foot, second frame foot, third frame foot, and fourth frame foot cooperate to completely support the generator on the foundation.

7. A generator supported by a foundation, the generator comprising:

a generator housing defining a first side and a second side that extend along a rotational axis of the generator;

a first plurality of frame feet removably attached to the first side; and a second plurality of frame feet removably attached to the second side, each frame foot including:

a plurality of fasteners arranged to threadably engage the generator housing; and a shear key engageable with the frame foot and the generator housing to inhibit movement in a direction normal to the rotational axis;

wherein a height of each frame foot is selected to position the rotational axis at a desired height above the foundation, and wherein a width of each frame foot is selected to engage the foundation.

8. The generator of claim 7, wherein the first side of the generator includes a plurality of rows of threaded apertures, each row arranged normal to the rotational axis to receive one of the plurality of fasteners, and a plurality of slots each arranged to receive a shear key.

9. The generator of claim 7, wherein each frame foot includes a foundation plate arranged to engage the foundation, a mounting plate perpendicular to the foundation plate, and a plurality of gusset plates extending between the mounting plate and the foundation plate.

10. The generator of claim 9, wherein the mounting plate is arranged to engage the generator housing.

11. The generator of claim 7, wherein the first plurality of frame feet includes two and only two frame feet and the second plurality of frame feet includes two and only two frame feet.

12. A method of supporting a generator in a foundation having an opening width, the method comprising:

selecting a generator having a housing, the housing including a right-side attachment space on a right side of the housing and a left-side attachment space on a left side of the housing that cooperate to define a housing width;

removably attaching a first frame foot to the right side of the housing, the first frame foot having a first height and a first width;

removably attaching a second frame foot to the left side of the housing, the second frame foot having a second height and a second width;

engaging a shear key with first frame foot and the right side of the housing; and attaching the generator to the foundation, wherein the first width and the second width are selected such that the sum of the first width, the second width, and the housing width is greater than the opening width, and wherein the first height and the second height are selected to position a centerline of the generator at a desired vertical elevation with respect to the foundation.

13. The method of claim 12, further comprising threadably engaging the first frame foot to the right side of the housing using a plurality of fasteners.

14. The method of claim 12, further comprising removably attaching a third frame foot to the right side of the housing and a fourth frame foot to the left side of the housing, the first frame foot, second frame foot, third frame foot, and fourth frame foot cooperating to completely support the generator on the foundation.

15. The method of claim 12, further comprising positioning a first shear key between the first frame foot and the housing and a second shear key between the second frame foot and the housing, the first shear key and the second shear key operable to inhibit movement of the generator housing in the vertical direction with respect to the first frame foot and the second frame foot.

16. The method of claim 12, further comprising positioning a foundation plate adjacent a mounting plate and welding a plurality of gusset plates to each of the foundation plate and the mounting plate to define the first frame foot.

* * * * *